G. LUNT.
APPARATUS FOR THE MANUFACTURE OF BREAD.
APPLICATION FILED OCT. 30, 1908.

1,071,164.

Patented Aug. 26, 1913.

INVENTOR
GEORGE LUNT.

G. LUNT.
APPARATUS FOR THE MANUFACTURE OF BREAD.
APPLICATION FILED OCT. 30, 1908.

1,071,164.

Patented Aug. 26, 1913.
4 SHEETS—SHEET 4.

Attest:
Ewd L. Tolson.
L. B. Middleton

Inventor.
George Lunt,
by Spear, Middleton, Donaldson & Spear
Attys.

UNITED STATES PATENT OFFICE.

GEORGE LUNT, OF FORMBY, ENGLAND.

APPARATUS FOR THE MANUFACTURE OF BREAD.

1,071,164.  Specification of Letters Patent.  Patented Aug. 26, 1913.

Application filed October 30, 1908. Serial No. 460,337.

*To all whom it may concern:*

Be it known that I, GEORGE LUNT, a subject of the King of Great Britain and Ireland, and residing at Formby, in the county of Lancaster, England, have invented certain new and useful Improvements in Apparatus for the Manufacture of Bread, of which the following is a specification.

It has heretofore been proposed to introduce air into dough during its formation in the mixer by passing air into the mixer, but I have found by experiment that this does not give any substantial benefit. Difficulties occur in introducing air into the dough by means of holes in the mixer walls or by ordinary perforated pipes within the mixer owing to the very high surface tension and great tenacity of the dough and experiment shows that the air bubbles introduced by means of a series of perforations below the dough mass coalesce and escape without substantially stretching and permeating the dough. I have found however, that a very considerable improvement in the whiteness and the volume of the baked products of the dough is obtained by subjecting the dough to a thorough permeation by oxygen, air or other suitable gas containing free oxygen preferably at a period subsequent to its formation in the mixer and preferably after the lapse of a part of the period of fermentation. I have found that it is less advantageous to treat the dough either at too early or at too late a stage of the fermentation period as the full improvement in color and in volume may not then be realized.

The object of the present invention is to provide an improved apparatus for treating dough in such a manner that the baked products thereof shall be whiter in color and may be of greater volume than those obtained from dough prepared by the methods hitherto known, this being accomplished by causing abundant quantities of oxygen air or other suitable gas containing free oxygen thoroughly to permeate the dough mass preferably after the lapse of a part of the period of fermentation.

I wish it to be understood that the word "dough" as used herein is intended to apply only to the mass after all the ingredients have been brought together.

The invention includes the novel features of construction and combination of parts hereinafter described and particularly defined by the appended claims.

The invention is illustrated by the accompanying drawings in which—

Figure 1:
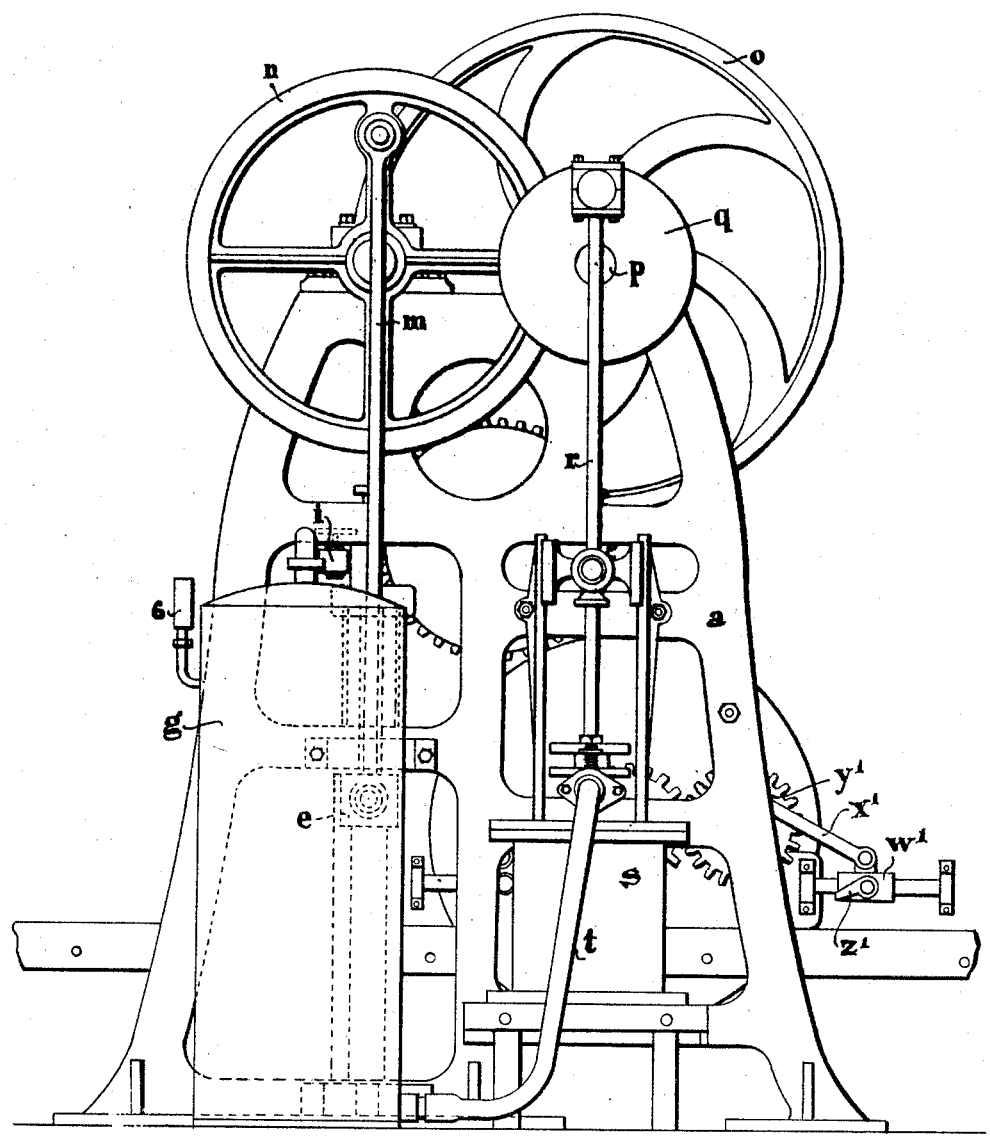
Figure 2:
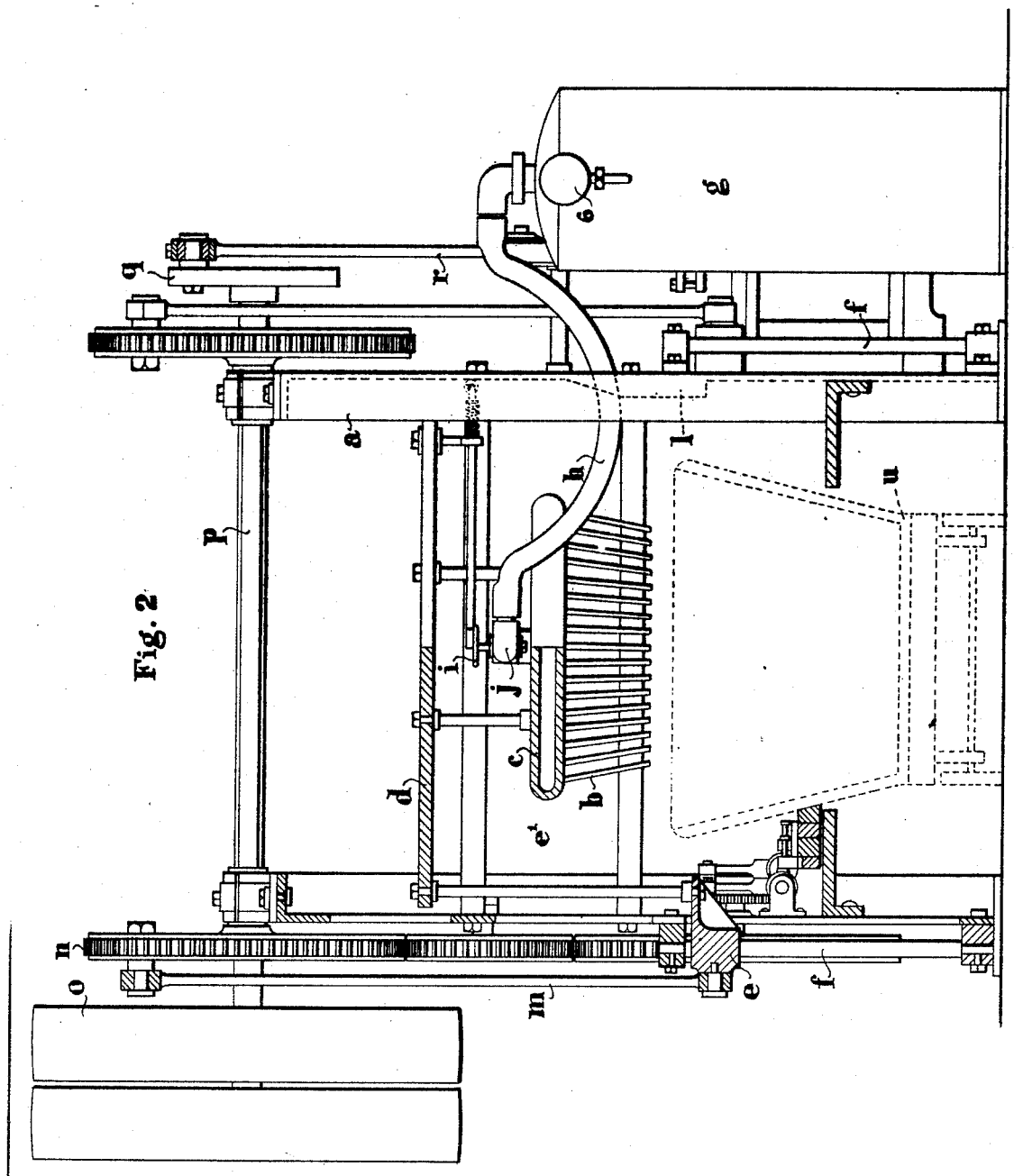
Figure 3:
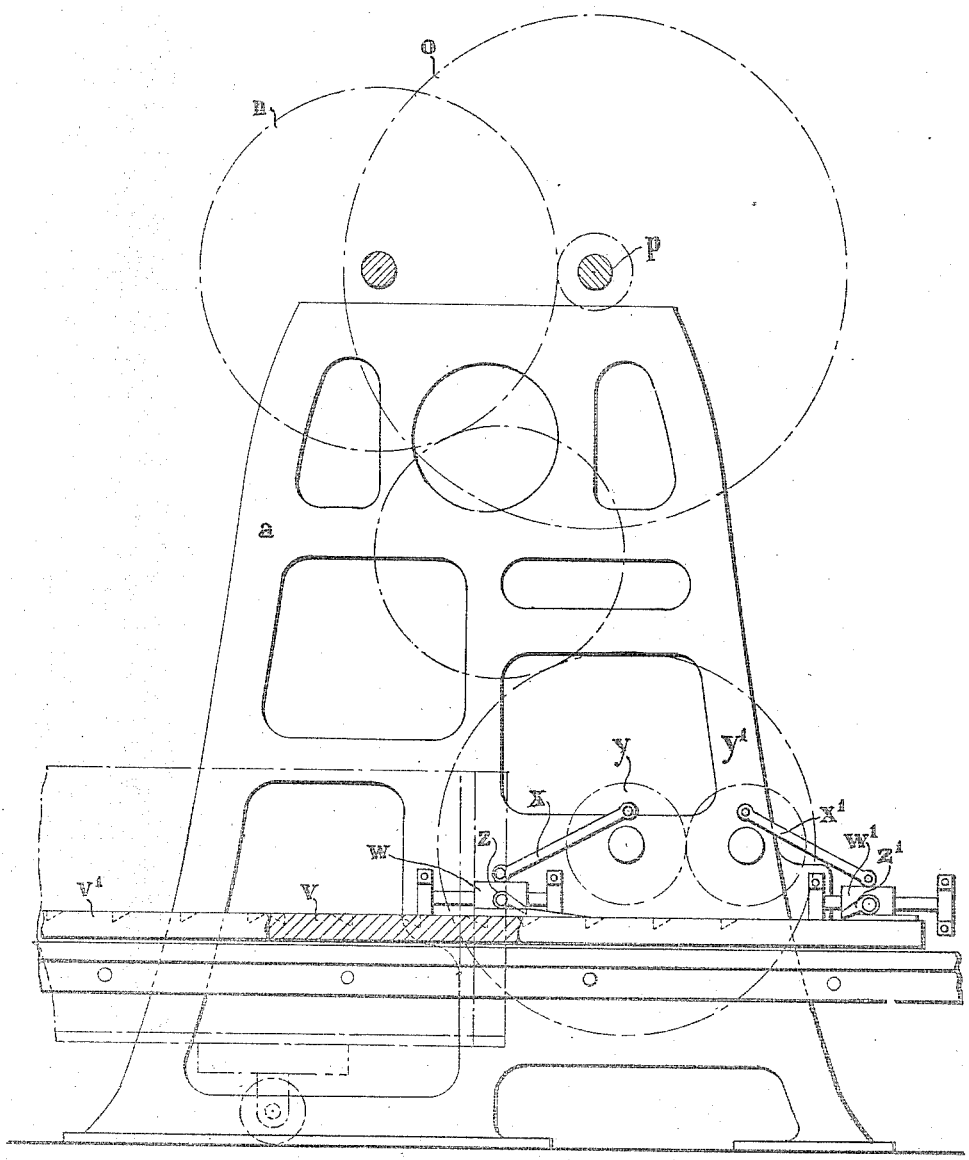
Figure 4:
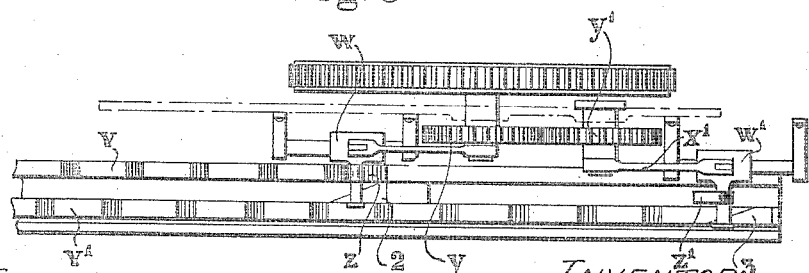
Figure 5:
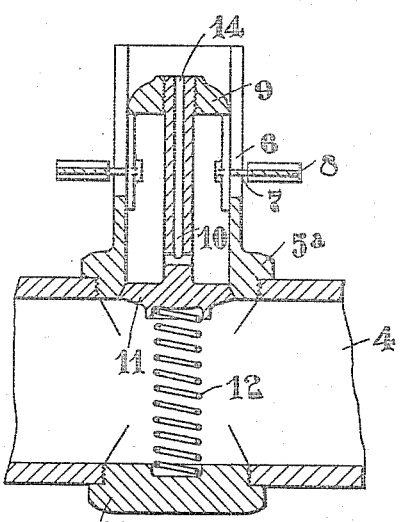
Figure 6:
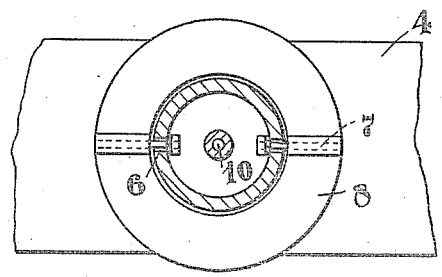
Figure 7:
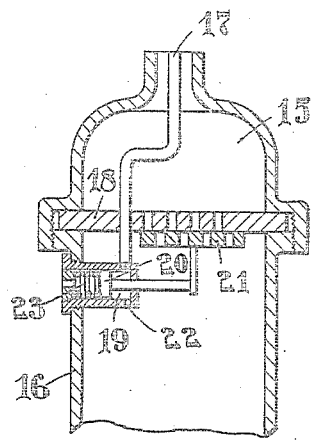

Figure 1 is an end elevation of a modification in which vertically reciprocating nozzles are employed. Fig. 2 is a side elevation of same. Fig. 3 is a diagrammatic view of the same apparatus showing the dough trough traversing means. Fig. 4 is a detail view in plan of part of the traversing arrangement. Figs. 5 and 6 represent respectively the elevation and plan of a form of apparatus in which the admission of the gas is controlled by the contact of the dough with parts connected with the nozzles. Fig. 7 is a further modification in which the admission of the gas to the nozzles or the like is controlled by the action of the dough in sealing the nozzles.

In Figs. 1, 2, 3 and 4, $a$ is the frame of the machine, $b$ the series of vertically reciprocating prongs or nozzles fixed to the hollow head, $c$, which is attached to the frame, $d$, supported on the cross heads, $e$, by the pillars, $e'$, the cross heads being guided so as to reciprocate vertically in the guides, $f$, attached to the frame, $a$. $g$ is an air or gas supply chamber, connected by a flexible pipe, $h$, with the hollow head, $c$. $i$ is a valve of the union, $j$, to which the pipe, $h$, is connected, which valve is operated by a rod, $k$, the end of which as the head, $c$, moves up and down, strikes against a cam plate, $l$, and so opens the valve, $i$, on the down stroke, while during the up-stroke so soon as the rod is free from the cam piece, $l$, the valve, $i$, closes by the pressure of the spring, 5. The cross heads, $e$, are coupled by connecting rods, $m$, to the wheels, $n$, which are driven by the shaft, $p$, and pulley, $o$, and thus the prongs, $b$, are reciprocated up and down, and penetrate into the dough in the trough, $u$. On the shaft, $p$, is a crank disk, $q$, which drives by means of the connecting rod, $r$, the piston of the pump, $s$. This pump supplies by a pipe $t$. the chamber, $g$, so that air is compressed therein, the gage, 6, indicating the pressure contained in the chamber, $g$. $u$ is the trough in which the dough is placed, $v\ v'$ racks attached or coupled to the trough. $w$ is a slide reciprocated by a connecting rod, $x$, and crank disk, $y$, deriving its motion in any suitable manner from the main shaft, $p$. $z$ is a pawl, on the slide, $w$, engaging a rack, $v$. $w'$, $x'$ and $y'$ are respectively a similar slide, connecting rod and crank disk, which operate so as to reciprocate a pawl, $z'$, in the reverse direction to the pawl, $z$. The pawl, $z'$, engages a rack, $v'$. It will be seen that in the position shown in the figures the pawl, $z$, is causing the trough to travel longitudinally step by step toward the right, that is to say, the trough has just completed its travel toward the left, and the pawl, $z$, is commencing to move the trough back again toward the right. 2 and 3 are inclined pieces fixed to the racks, and there are similar inclined pieces at the other end of the two racks. As the trough travels along toward the left the pawl, $z$, comes against the inclined piece, 2, and Fig. 4 shows this pawl just moved by the inclined piece, 2, into gear with the rack, $v$, while the inclined piece, 3, had moved the pawl, $z'$, out of gear with the other rack, $v'$, into the inoperative position between the racks. Consequently the motion of the racks has just been reversed and the trough is being traversed step by step toward the right.

One method of operation may be briefly summarized as follows:—The trough having been supplied with dough the machine is set in motion and causes oxygen, air or other suitable gas containing free oxygen to be pumped into the reservoir, $q$. The prongs, $b$, descend, and penetrate the dough in the trough, and the arms striking against the cam, $l$, open the valve, $i$, and cause the air or gas under pressure to penetrate into the interior of the dough mass. The prongs, $b$, rise out of the dough, the air or gas issuing through the perforations is cut off by the valve, and the trough, $u$, is traversed longitudinally a short distance. The prongs, $b$, again descend and inject a further quantity of air or gas into another section of the dough, and so the operation is repeated again and again until the whole mass of the dough is aerated throughout its whole length. The operation is continued for some time, the dough trough traversing backward and forward, until the dough is sufficiently aerated. Thus in one case in which an apparatus having sixty-two reciprocating tubular prongs of ¼ inch diameter bore was employed it was found that one complete travel backward and forward of the trough was sufficient to thoroughly aerate the dough contained therein the pressure of the air in the reservoir varying from twenty pounds per square inch at the beginning to ten pounds per square inch at the end of each stroke of the prongs or nozzles the depth of the dough in the trough being about fourteen inches. Under such treatment I have obtained a very marked whitening of the bread and an increase in volume of as much as five per cent. as compared with bread from an equal quantity of untreated dough.

In place of the apparatus described above any other suitable form of apparatus may be employed which is adapted to insure the complete penetration of the dough by the gas. For example any ordinary form of kneader may be employed for carrying out this process by adding means for introducing air or gas under pressure into the interior of the dough mass. In one form hollow stirring arms may be employed provided with nozzles adapted to penetrate the dough and be more or less sealed thereby. The penetration into the dough or the sealing of the nozzles is employed to control the introduction of the air or gas and the passing out into the atmosphere of the nozzles causes the supply to be cut off. Thus in the form illustrated in Figs. 5 and 6, 4 is a section of an air channel upon which is mounted a nozzle consisting of an outer casing, $5^a$, screwed into a recess in the air channel and having two longitudinal slots, 6, in opposite sides of it in which travel two arms, 7, carrying a disk, 8. This disk is connected by the said arms, 7, to a moving inner part consisting of a nozzle proper, 9, a hollow tube, 10, and a valve, 11, which is retained in its seat by a spring, 12, attached to the screwed cap, 13. Thus when the nozzle penetrates into the dough the latter comes into contact with the disk, 8, and by this means depresses the valve which then allows air to pass from the hollow beater arm past the valve, 11, through the hollow tube, 10, out of the orifice, 14, into the dough. When the beater arm emerges from the dough the spring then acts to close the valve and the air supply is cut off. Further, in Fig. 7 is shown a form of apparatus in which the sealing of the nozzles by the dough controls the introduction of the air or gas into the dough mass. This form consists of a cap, 15, screwed onto a tubular projection, 16, on a hollow beater arm. Within this cap there is a small tube, 17, passing through a perforated plate, 18, and opening into a small air chamber, 19, in which moves a piston, 20, carrying upon its end a perforated plate, 21, which is adapted to slide across the surface of the similar plate, 18. When the cap penetrates into the dough the orifice of the tube, 17, through which the slow stream of air is continually passing by means of the small hole, 22, becomes sealed. Sufficient pressure is created in the chamber, 19, to overcome the resistance of the spring, 23, and the piston, 20, then moves the plate, 21, until the holes in the said plate coincide with those in the plate, 18. The main blast of air can then issue freely and it will be seen that a bubble of gas will then be formed within the dough mass. It will be seen that in this form when a bubble of a certain magnitude has been formed around the orifice of the nozzle a balancing of pressure will occur and the piston will then return to its original position. This form will therefore give rise to intermittent introduction of air in the dough mass. If it be desired, however, that a continuous supply be insured the small tube can be so constructed as to emerge in some position outside the main orifice and somewhat removed from it thus being completely sealed by dough as long as the nozzle is within the dough.

It will be readily seen that nozzles of the character described may be used on fixed air channels or on air channels which also form beater arms with the effect of securing the desired complete aeration. A simple syringe may be used to permeate the dough mass with air or gas. The syringe is caused repeatedly to stab the dough and while inserted to deliver air or gas stretching the dough. When this is done at many points the results I have above indicated are obtained.

I have above indicated that thorough permeation and stretching of the dough by oxygen air or other suitable gas containing free oxygen may be effected at any time after the whole ingredients of the dough have been brought together, but I have found that a marked increase in size of loaf generally results, and a decided whitening of the bread is effected if the dough be treated by the process after the lapse of one quarter or a greater portion of the usual time of fermentation. If, for example, the interval of time between mixing the dough and placing the latter in the oven be about four hours, the process is advantageously applied to the dough one hour or more after the latter has been mixed, and I find the best results are obtained by applying the process after about three hours from mixing. As the introduction of the air or gas usually causes a temporary decrease in the volume of the dough itself it is for most purposes preferable to allow the dough to ferment for at least half an hour after the last treatment with air or gas before placing it in the oven, so that the dough may regain its former volume and the increase of volume of the bread may be realized. It is found that the most marked results are obtained with the lower grades of flour.

Having now described my invention what I claim as new and desire to secure by Letters Patent is:—

1. An improved apparatus for the treatment of dough comprising a support for the dough, a plurality of reciprocating fluid supply nozzles, means for causing the nozzles to penetrate the dough and means for supplying fluid through the nozzles only while they are immersed within the dough, as set forth.

2. An improved apparatus for the treatment of dough comprising in combination an elastic fluid pump, reciprocating elastic fluid supply means, elastic fluid supply controlling means, an element operating said elastic fluid supply controlling means and a traveling dough support, as set forth.

3. An improved apparatus for the treatment of dough comprising in combination an elastic fluid pump, vertically reciprocating elastic fluid nozzles, an elastic fluid supply control valve, a valve operating cam, a dough trough and rack and pawl trough reciprocating means, as set forth.

4. In an apparatus for aerating dough, in combination with a dough support and dough penetrating gas introducing means, a gas supply control valve and an operating means therefor operable by contact with a surface disposed in proximity to said operating means; as set forth.

5. In an apparatus for aerating dough in combination, a dough support, gas introducing means movable relatively thereto, gas supply means, an element normally tending to throttle the same, a pressure operated dethrottling element, and a pressure exerting surface adapted to co-act with said element; as set forth.

6. In an apparatus for aerating dough, in combination, relatively movable dough supporting means and gas introducing means, a gas supply conduit, a pressure operated cut off co-acting with the same, and a pressure creating surface adapted to co-act with said cut-off; as set forth.

7. In an apparatus for aerating dough, in combination, relatively movable dough support and dough penetrating elements, gas introducing means in conjunction with the same, a gas supply cut off means, a pressure transmitting element operating the same, and pressure means operated by a relative motion of the dough support and penetrating means; as set forth.

8. In apparatus for aerating dough, in combination a dough support, gas introducing means movable relatively with respect thereto, gas supply means, an element normally tending to throttle the same, a pressure operated de-throttling element, and means adapted automatically to provide the pressure for effecting de-throttling, as set forth.

In testimony whereof, I affix my signature in presence of two witnesses.

GEORGE LUNT.

Witnesses:
 EDWARD PAUL,
 WM. PIERCE.